Figure 3:
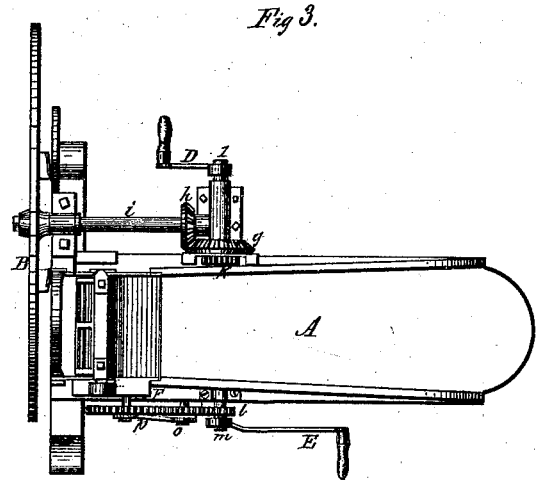
Figure 4:
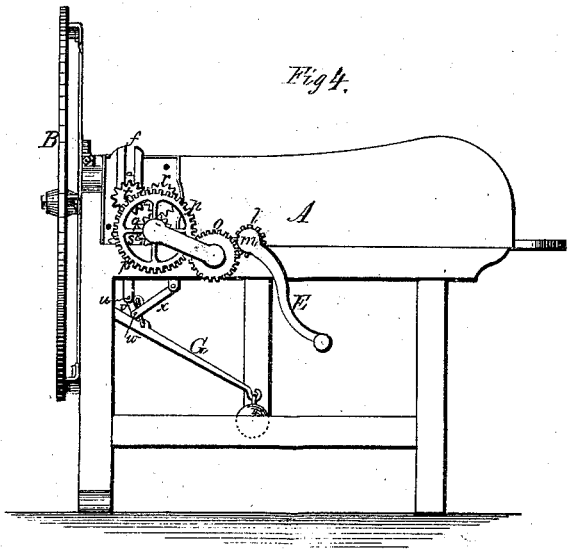

2 Sheets--Sheet 1.
A. VAHLDIECK.
Straw-Cutter.
No. 165,389. Patented July 6, 1875.
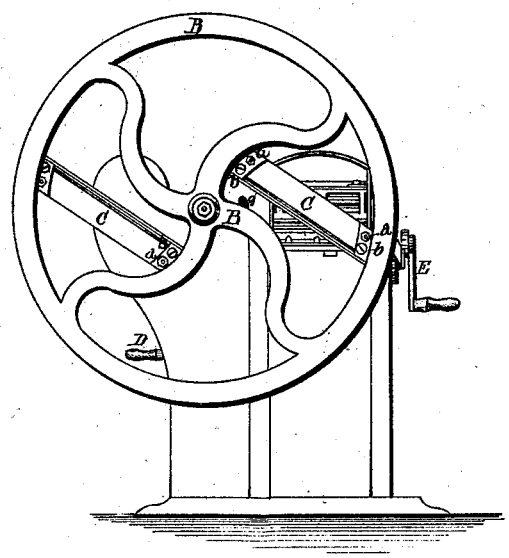
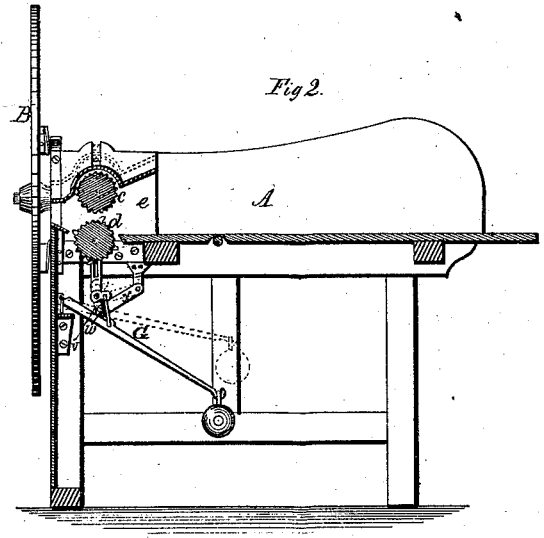
WITNESSES.
INVENTOR.
Andreas Vahldieck
per F. A. Lehmann
Atty.

2 Sheets--Sheet 2.

A. VAHLDIECK.
Straw-Cutter.

No. 165,389. Patented July 6, 1875.

WITNESSES.

INVENTOR.
Andreas Vahldieck
per F. A. Lehmann
Atty.

UNITED STATES PATENT OFFICE.

ANDREAS VAHLDIECK, OF JOHNSONVILLE, WISCONSIN.

IMPROVEMENT IN STRAW-CUTTERS.

Specification forming part of Letters Patent No. 165,389, dated July 6, 1875; application filed April 15, 1875.

*To all whom it may concern:*

Be it known that I, ANDREAS VAHLDIECK, of Johnsonville, in the county of Sheboygan and State of Wisconsin, have invented certain new and useful Improvements in Hay and Straw-Cutting Boxes; and I do hereby declare the following to be a full, clear, and exact description of the invention, such as will enable others skilled in the art to which it pertains to make and use it, reference being had to the accompanying drawings which form part of this specification:

My invention relates to an improvement in hay and straw-cutting boxes, and it consists in the arrangement and combination of parts which will be more fully described hereafter.

The accompanying drawings represent my invention.

A represents a common cutting-box, at the side of which, slightly in advance of the front end, is the wheel B, to which are fastened the straight cutters or knives C. The knives are placed at right angles to the shaft of the wheel B, and this shaft, being journaled higher than the bottom of the box, causes the outer points of the cutting-edges to cut first and the blades to glide slantingly down, cutting the hay or straw in its gradual descent with greater facility than could be done in any other position. The knives, at their backs, are secured to projections of the wheel by screw-bolts and nuts $a$, and the edges are adjusted to the steel in front of the box by means of set-screws $b$.

From the front of the box the bottom descends as far back as to the feeding-rollers, which rollers, $c$ $d$, are corrugated, and the lower one, $d$, has also short points projecting from its surface, so that any hay or straw which has been drawn in between them is necessarily forced forward to the knives.

The upper roller $c$ is journaled in the sides of the compressing box $e$, which box slides in the slots $f$, and yields readily upward when required. The opening at the rear of the box $e$ is widening for the hay or straw to enter, while the front part, into which the straw is forced by the rollers, is contracting, whereby the material to be cut is closely compressed and much easier cut.

The feeding-rollers $c$ and $d$ and the wheel B are kept in motion by turning the crank D upon the shaft 1, on which is the beveled-wheel $g$, gearing with the beveled-pinion $h$ upon the wheel-shaft $i$. Between the beveled-wheel $g$ and the box A, upon the inner end of the crank-shaft, is the pinion $k$, which gears with the pinion $l$ at the outer end of the shaft $m$, which shaft passes under the bottom of the box A across to the other side, and has near its other end the pinion $n$. To this shaft a second crank E is or may be attached, so as to turn the machine on either or on both sides. An idle-wheel $o$ connects the pinion $n$ with the wheel $p$, upon the axis of which, within the inclosed box F, is a pinion, $q$, which gears with both the idle-wheel $r$, immediately above it, and with $s$, the one upon the axis of the lower roller $d$, which idle-wheel $r$ gears with the pinion $t$ upon the axis of the upper roller $c$. The idle-wheel $r$ and the pinion $t$ are relatively so placed that whether the pinion be raised or not the gearing of the two remains unbroken.

Thus by turning the crank on either side of the box A the whole train of wheels is set in motion. The sides of the compressing-box $e$, which move in the slots $f$ in the sides of the box A, extend downward below the bottom of the box, and are there united by the rod $u$, which is pivoted in their ends. With the rod $u$ is connected, by means of the short rods $v$, the rod $w$ in the ends of the braces $x$, secured under the bottom of the box A. To the middle of the rod $u$ is hung the weighted lever G, which, when the box $e$ with the upper roller $c$ has been forced upward by the hay or straw, draws them downward and compresses whatever may have gotten in between the two rollers.

By this arrangement of rods and levers, a compound-lever is formed, whereby the rollers are made to take a firmer hold upon the material being cut, and also prevents the dead heavy jar upon the frame caused by the fall ing of the weight, after having been raised upward by a lump or thickness in the hay or straw passing between rollers.

I am aware that a shaft, having a handle upon each end and passing under the box, and for the purpose of operating the cutting-wheel, is not new. I am also aware that rollers made vertically adjustable are not now, and these I disclaim.

Having thus described my invention, I claim—

The combination of the rollers $c$ $d$, slotted-lever $u$, rods $v$ $x$, and weighted lever G, whereby the straw and hay being cut is held more firmly and the frame prevented from being jarred and shaken by the falling of the weight after having been raised, substantially as set forth.

In testimony that I claim the foregoing I have hereunto set my hand this 29th day of March, 1875.

ANDREAS VAHLDIECK.

Witnesses:
 JULIUS BODENSTAB,
 HENRY RAUTMANN.